US012085810B2

United States Patent
Wakabayashi et al.

(10) Patent No.: US 12,085,810 B2
(45) Date of Patent: Sep. 10, 2024

(54) LIQUID CRYSTAL DISPLAY DEVICE AND DISPLAY DEVICE

(71) Applicant: Japan Display Inc., Tokyo (JP)

(72) Inventors: Yuta Wakabayashi, Tokyo (JP); Yasuyuki Hanazawa, Tokyo (JP); Michikazu Noguchi, Tokyo (JP); Hiromichi Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/314,135

(22) Filed: May 9, 2023

(65) Prior Publication Data
US 2023/0367155 A1    Nov. 16, 2023

(30) Foreign Application Priority Data

May 11, 2022    (JP) ................. 2022-077900

(51) Int. Cl.
*G02F 1/1335*    (2006.01)
*G02F 1/1333*    (2006.01)
*G02F 1/1334*    (2006.01)
*G02F 1/13357*    (2006.01)

(52) U.S. Cl.
CPC .. *G02F 1/133628* (2021.01); *G02F 1/133331* (2021.01); *G02F 1/133385* (2013.01); *G02F 1/1334* (2013.01); *G02F 1/133615* (2013.01); *G02F 1/133322* (2021.01); *G02F 2201/07* (2013.01); *G02F 2203/01* (2013.01)

(58) Field of Classification Search
CPC ......... G02F 1/133628; G02F 1/133331; G02F 1/33385; G02F 1/1334; G02F 1/133615; G02F 1/133322; G02F 2201/07; G02F 2203/01

See application file for complete search history.

(56) References Cited

U.S. PATENT DOCUMENTS

| | | | |
|---|---|---|---|
| 2008/0106915 A1* | 5/2008 | Okuda | G02B 6/0063 362/628 |
| 2018/0373075 A1* | 12/2018 | Cheng | G09G 3/3406 |
| 2021/0333613 A1 | 10/2021 | Hiramoto et al. | |
| 2021/0364849 A1 | 11/2021 | Kanesaka | |

FOREIGN PATENT DOCUMENTS

| | | |
|---|---|---|
| JP | 2020-112686 A | 7/2020 |
| JP | 2021-4975 A | 1/2021 |
| JP | 2021-184052 A | 12/2021 |
| WO | 2020/261796 A1 | 12/2020 |

* cited by examiner

*Primary Examiner* — Anne M Hines
*Assistant Examiner* — Jose M Diaz
(74) *Attorney, Agent, or Firm* — XSENSUS LLP

(57) ABSTRACT

The following structure mitigates problems caused by heat generated by the LED and the driver IC. A liquid crystal display device including a liquid crystal display panel in which liquid crystal is sandwiched between a TFT substrate, having a pixel, and a counter substrate including: a display area being formed in an area in which the TFT substrate and the counter substrate overlap each other, a terminal area being formed on the TFT substrate, in which the counter substrate does not overlap, the terminal area being formed along a first side of the counter substrate which extends in a first direction, a second cover glass being disposed on the counter substrate, and a first cover glass being disposed under the TFT substrate, in which a width of the first cover glass in the first direction is larger than a width of the second cover glass in the first direction.

20 Claims, 19 Drawing Sheets

LIQUID CRYSTAL DISPLAY DEVICE AND DISPLAY DEVICE

CLAIM OF PRIORITY

The present application claims priority from Japanese Patent Application JP 2022-077900 filed on May 11, 2022, the content of which is hereby incorporated by reference into this application.

BACKGROUND OF THE INVENTION

(1) Field of the Invention

The present invention relates to a display device and, more particularly, to a transparent display device which uses a liquid crystal display device.

(2) Description of the Related Art

There is a need for a transparent display, in which a background is visible like glass. When display images are displayed in a transparent display device, a background can be overlapped with the display images when seen from front or back of the display device. In an area in which images are not displayed, a background is visible through glass. Such a transparent display can be realized by a liquid crystal display device. When a liquid crystal display device is used for the transparent display device, high transparency can be realized compared with when an OLED display device is used in which many wrings and transistors exist.

In a transparent Liquid crystal display device, both an LED (Light Emitting Diode) and a driver IC become high temperature, therefore, if those two components are disposed closely each other, the corresponding region becomes high temperature. Patent document 1 discloses that a plurality of LEDs are disposed, but not aligned in line, so that two components are not disposed in close position each other.

PRIOR ART REFERENCE

Patent Document

Patent document 1: Japanese Patent Application Publication 2021-184052
Patent document 1: Japanese Patent Application Publication 2021-4975
Patent document 1: Japanese Patent Application Publication 2020-112686

SUMMARY OF THE INVENTION

In a transparent liquid crystal display device, a direct back light cannot be used. Consequently, a side light type back light, in which a light source is disposed to, e.g., a side of the substrate, is used. LEDs are used in an actual back light; the LED generates heat as well as emits light. In the side light type, many LEDs are disposed in a small area, as along a side surface of the substrate, thus, high temperature at the light source becomes a problem.

In a transparent liquid crystal display device, a color filter is not used for raising a light utilizing efficiency. That is to say, a color filter decreases a light utilizing efficiency to ⅓. In addition, the color filter deteriorates a transmission of light. A field sequential method can eliminate a color filter; however, the field sequential method needs high frequency driving, thus, a heat generation in a driver IC becomes a problem.

A purpose of the present invention is, in a transparent liquid crystal display device of the side light type back light, to suppress a rising of temperature of the LED and the driver IC and so forth, and thus, to suppress a decrease in light emitting efficiency of the LED, to avoid malfunction of the driver IC, and to suppress deterioration of peripheral parts due to thermal expansion and so forth.

Another purpose of the present invention is to realize a structure of a transparent liquid crystal display device, in which a mechanical stress from the housing is not transferred to components for a light guide such as, a cover glass, a lens, an LED and so forth, so that an accurate light pass can be maintained; thus, to realize a transparent liquid crystal display device of high display image quality and improved light utilizing efficiency.

The present invention realizes the above purposes; representative measures are as follows.

(1) A liquid crystal display device including a liquid crystal display panel in which liquid crystal is sandwiched between a TFT substrate, having a pixel, and a counter substrate including: a display area being formed in an area in which the TFT substrate and the counter substrate overlap each other, a terminal area being formed on the TFT substrate, in which the counter substrate does not overlap, the terminal area being formed along a first side of the counter substrate which extends in a first direction, a second cover glass being disposed on the counter substrate, and a first cover glass being disposed under the TFT substrate, in which a width of the first cover glass in the first direction is larger than a width of the second cover glass in the first direction.

(2) A display device including: a liquid crystal display panel in which liquid crystal is sandwiched between a TFT substrate, having a pixel, and a counter substrate, a supporting portion, on which the liquid crystal display device is disposed, a frame portion which surrounds the liquid crystal display device, the display device further including: a display area being formed in an area in which the TFT substrate and the counter substrate overlap each other, a terminal area being formed on the TFT substrate, in which the counter substrate does not overlap, the terminal area being formed along a first side of the counter substrate which extends in a first direction, a second cover glass being disposed on the counter substrate, and a first cover glass being disposed under the TFT substrate, in which a width of the first cover glass in the first direction is larger than a width of the second cover glass in the first direction, and an extending portion in the first direction of the first cover glass is supported by the supporting portion.

(3) The display device according to (2), in which the second cover glass is not supported by the supporting portion.

(4) The display device according to (2) in which the extending portion in the first direction of the first cover glass is sandwiched by a first frame and a second frame.

(5) The display device according to (2), in which the second cover glass is not sandwiched by a first frame and a second frame.

BRIEF DESCRIPTION OF THE DRAWINGS

FIG. 17 is a plan view in which FIG. 15 is viewed from the top (from the direction A);

DETAILED DESCRIPTION OF THE PREFERRED EMBODIMENTS

The present invention is explained in detail by the following embodiments.

Embodiment 1

Figure 1:
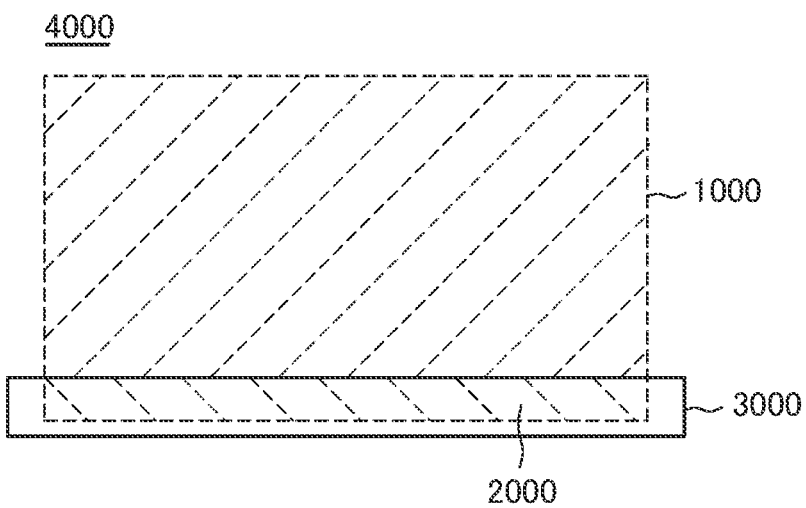
FIG. 1 is a front view of a transparent liquid crystal display device.
Figure 2:
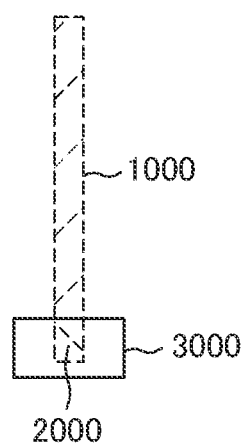
FIG. 2 is a side view of the transparent liquid crystal display device.

FIG. 1 is a front view of a transparent liquid crystal display device 4000; FIG. 2 is a side view of the transparent liquid crystal display device 4000. In FIGS. 1 and 2, a back light does not exist at a back of the display area 1000; since the substrate is formed from transparent glass, light can pass through the substrate in a normal state, and a background beyond the transparent liquid crystal display device 4000 is visible. A driving part 2000, which includes a light source of a side light type and an area for a driving circuit, is disposed in the housing 3000 at the bottom. Images displayed in the display area 1000 of the display panel are visible from both sides, namely, aback side and a front side, of the display area 1000. Images displayed in the transparent liquid crystal display device can give an illusion as that it is projected in the background.

Figure 3:
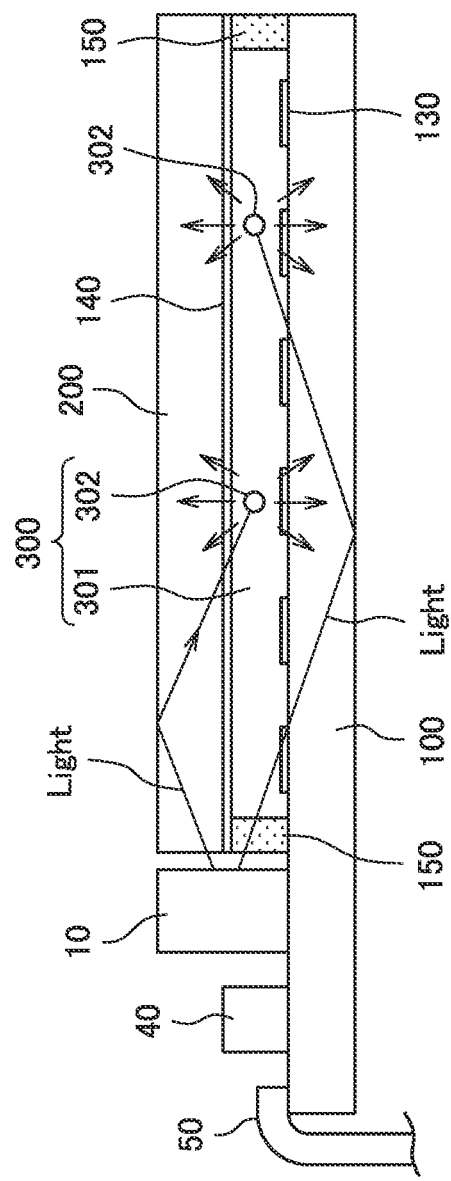
FIG. 3 is a cross sectional view to explain a function of the transparent liquid crystal display device.

FIG. 3 is a cross sectional view to show a function of the transparent liquid crystal display device 4000. FIG. 3 is a basic structure of the transparent liquid crystal display device. In FIG. 3, the liquid crystal 300 is sandwiched between the TFT substrate 100, on which pixel electrodes 130, signal wirings, TFTs and so forth are disposed, and the counter substrate 200, on which a common electrode 140 is disposed. In FIG. 3, the transparent liquid crystal display device does not have color filters because it is driven by so called field sequential method. The display area is formed in a place in which the TFT substrate 100 and the counter substrate 200 overlap each other; the terminal area is formed on the TFT substrate 100 in an area, in which the counter substrate 200 does not overlap the TFT substrate 100.

Figure 4:
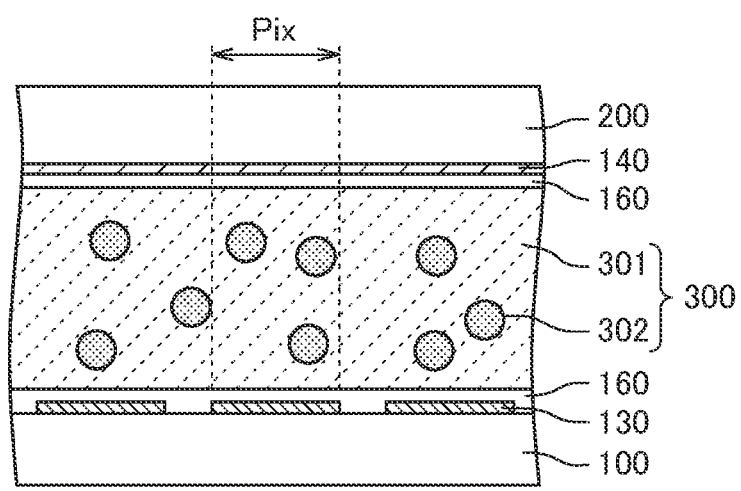
FIG. 4 is a detailed cross-sectional view of a liquid crystal layer.

In FIG. 3, the TFT substrate 100 and the counter substrate 200 are adhered to each other by a seal material 150; the liquid crystal 300 is sealed thereinside. The seal material 150 is formed from a transparent resin. The liquid crystal 300 in FIG. 3 is so called polymer dispersed liquid crystal; FIG. 4 shows a structure of polymer dispersed liquid crystal. FIG. 4 is an enlarged cross-sectional view of FIG. 3 at the liquid crystal portion. In FIG. 4, the liquid crystal 300 is sandwiched between the TFT substrate 100, on which pixel electrodes 130 and an alignment film 160 are formed, and the counter substrate 200, on which the common electrode 140 and the alignment film 160 are formed. In FIG. 4, the pixel Pix is formed corresponding to the pixel electrode 130.

The liquid crystal 300 is so called polymer dispersed liquid crystal, which is constituted from a bulk 301 formed from high molecular (polymer) and fine particles 302 containing liquid crystal molecules. When a voltage is applied between the pixel electrode 130 and the common electrode 140, the fine particles 302, which contain liquid crystal molecules, rotate and scatter the light. When a voltage is not applied between the pixel electrode 130 and the common electrode 140, the light is not scattered. Since the scattering of the light is controlled in each of the pixels, images can be formed. The images are visible from both a front side and a back side of the liquid crystal panel.

Back to FIG. 3, the TFT substrate 100 is made larger than the counter substrate 200; the portion of the TFT substrate 100, on which the counter substrate 200 does not overlap is a terminal area. The LED 10, which is a light source, is disposed opposing to a side surface of the counter substrate 200. Light from the LED 10 enters inside of the liquid crystal panel through the side surface of the counter substrate 200 or the seal material 150. The light collides the fine particles 302 containing liquid crystal molecules in the liquid crystal layer 300 after repeating total reflections in the liquid crystal panel.

When light collides a fine particle 302 located in a pixel in which a voltage is applied between the pixel electrode 130 and the common electrode 140, the light is scattered as shown in FIG. 3. On the other hand, light goes straight in a pixel in which a voltage is not applied between the pixel electrode 130 and the common electrode 140. Since a scattering of light, which entered the liquid crystal layer 300, is controlled in each of the pixels, display images are formed.

Figure 5:
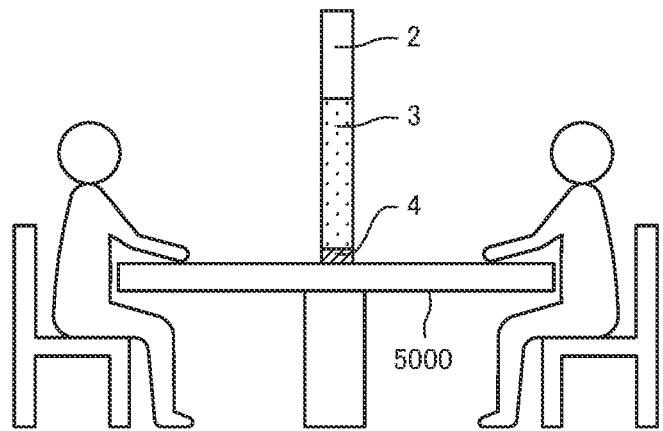
FIG. 5 is a cross sectional view which shows an example in which the transparent liquid crystal display device with a partition is being used.

FIG. 5 is a perspective view in which two persons face each other with a partition 2 between them; if the transparent liquid crystal display device of FIG. 3 is installed in the partition 2, a discussion can be made referring to the identical information. In FIG. 5, two persons sit across the table 5000, and a partition 2 is disposed between them; a liquid crystal display device 3 is installed in the partition 2. In FIG. 5, the liquid crystal display device 3 is supported by a supporting portion 4; the supporting portion 4 can have various structures.

Figure 6:
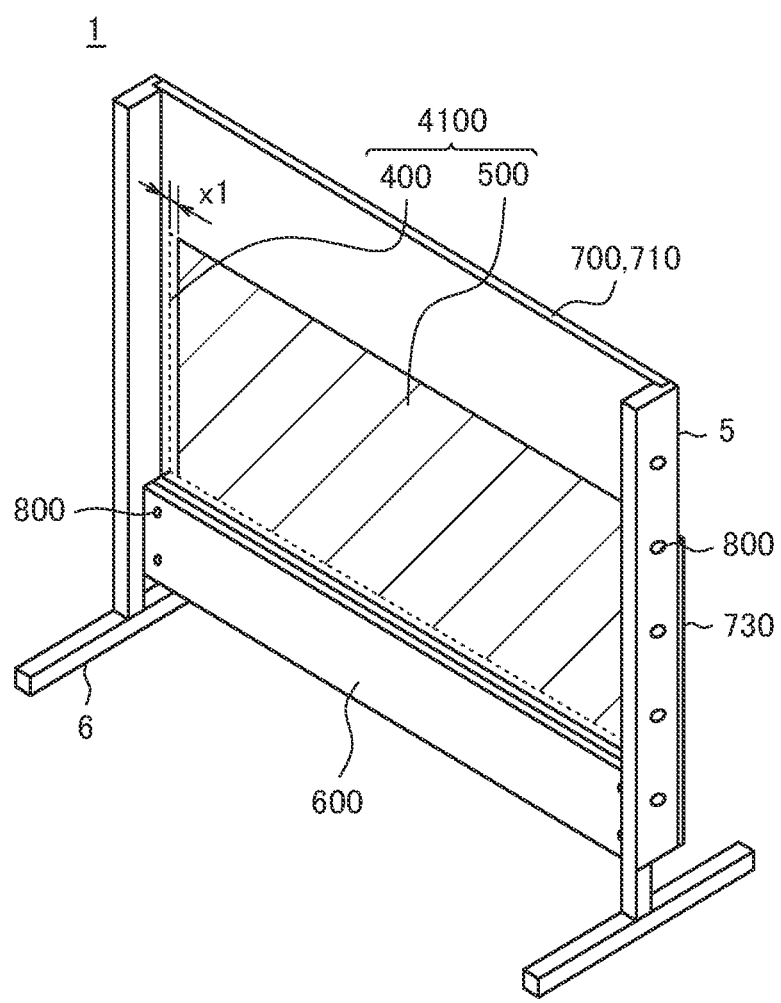
FIG. 6 is a perspective view of the transparent liquid crystal display device with a partition.

FIG. 6 is an example of a transparent liquid crystal display device with partition 1, which a transparent liquid crystal display device 4100 is disposed in a partition. In FIG. 6, the transparent liquid crystal display device 4100 is surrounded on three sides, namely, top and both sides, by a transparent board 700, which constitutes the partition, and is disposed on a supporting portion 600, which contains driving portions and so forth.

In FIG. 6, the transparent liquid crystal display device 4100 is constituted from the first cover glass 400 and the second cover glass 500, a width of the first cover glass 400 is larger by ×1 on one side than a width of the second cover glass 500 (herein after, the extended portion of the first cover glass may be called an extension 410); the extension is disposed on the supporting portion 600, thus, the transparent liquid crystal display device 4100 is supported. The extension 410 is sandwiched by transparent plates 710 and 730, thus, the transparent liquid crystal display device 4100 is fixed front and back. The transparent plates 710 and 730 are attached to the base 6 and fixed to the supporting post 5 by screws. By the way, although a structure of the base 6 is not described in detail, in FIG. 6, it is possible to be used, for example, as a power supply duct for the base 6, then power and signal can be supplied to the transparent liquid crystal display device 4100 through the base 6.

In the meantime, FIG. 3 is a structure to show a basic function of a transparent liquid crystal display device; however, this transparent liquid crystal display device has following problems. The driver IC 40 and the LED 10 as a light source, which are both heat source, are disposed in close location each other. A heat generation in the driver IC 40 is high because the transparent liquid crystal display panel of FIG. 3 is driven by field sequential method. In addition, many LEDs 10, which are light source, are aligned in a direction orthogonal to the sheet in FIG. 3. Therefore, temperature at this portion of the terminal area becomes very high. When temperature of an LED 10 becomes higher, light emitting efficiency of the LED 10 becomes lower; when temperature of a driver IC 40 becomes higher, malfunction in the driver IC 40 tends to occur, when temperatures of peripheral components become higher, strains in peripheral components increase, consequently, dimensional accuracies in the peripheral components are deteriorated due to thermal expansion. Further, the light from LED enters only from a side surface of the counter substrate 200, thus, it is difficult to secure enough amount of incident light.

Figure 7:
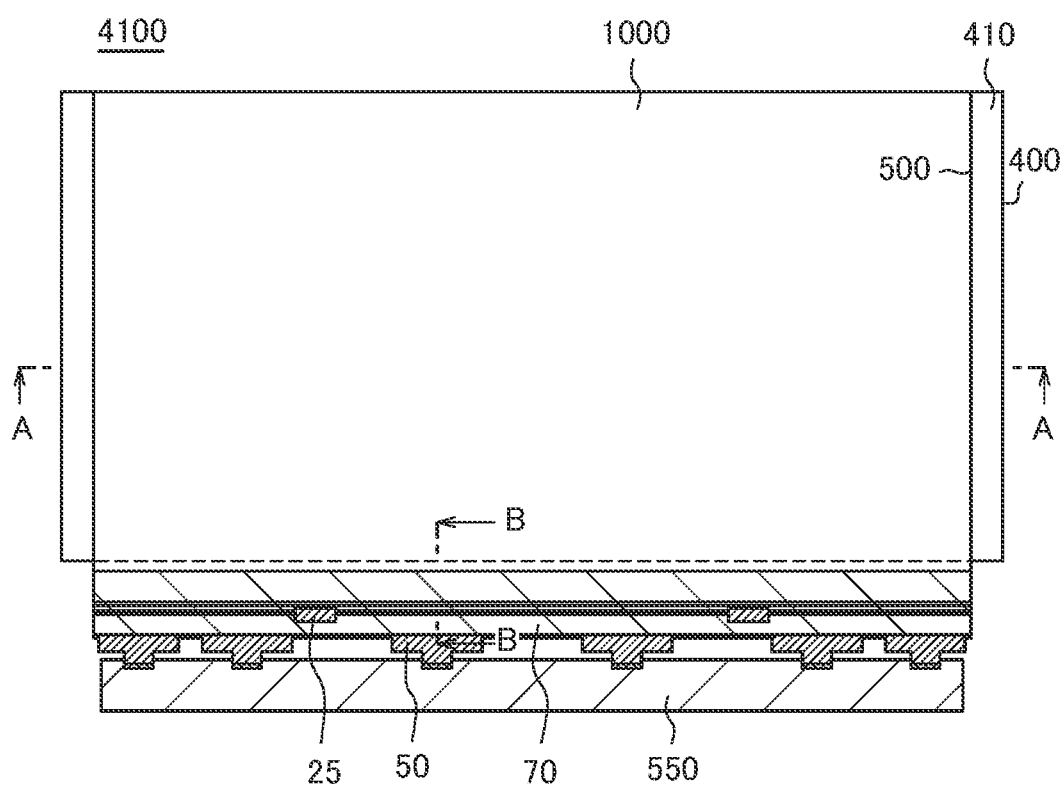
FIG. 7 is a front view of the transparent liquid crystal display device (the transparent liquid crystal display panel)
Figure 8:
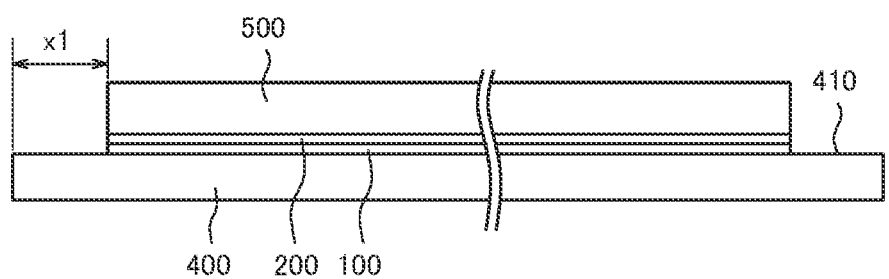
FIG. 8 is a cross sectional view of FIG. 7 along the line A-A.
Figure 9:
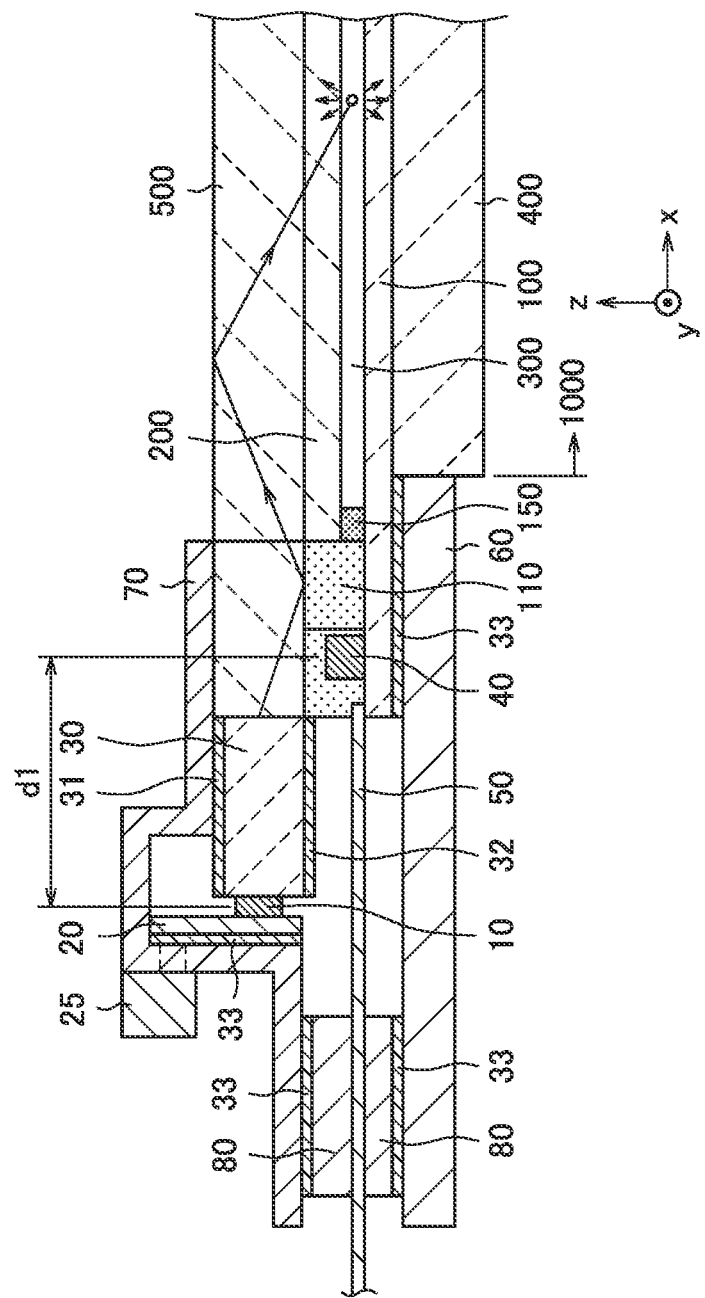
FIG. 9 is a cross sectional view of FIG. 7 along the line B-B.

The present invention solves the above problems by using the transparent display device, which is shown in FIGS. 7 through 9. FIG. 7 is a front view of the transparent liquid crystal display device 4100 according to embodiment 1. In FIG. 7, the transparent liquid crystal display device 4100 is formed from the display area 1000 and the driving area. The driving area is constituted from driving portion including light source 10 and the driver IC 40, the printed circuit board (PCB) 550 and the flexible wiring substrates 50, which are connected to the printed circuit board (PCB) 550. In FIG. 7 the driving portion is covered by a second heat dissipation plate 70 formed from metal. In embodiment 1, the second heat dissipation plate 70 is made from aluminum.

In FIG. 7, a socket 25 is disposed to each of the two portions in the second heat dissipation plate 70. The sockets are connected to the LED substrate, which is disposed inside of the second heat dissipation plate 70, and supply power to the LEDs. In FIG. 7, six flexible wiring substrates 50 are disposed. Among the six wiring substrates 50, outer most two of them are connected to a driver IC for scan lines; four of them are connected with a driver IC for video signal lines. Since heat generation in the driver IC for the video signal lines is larger than heat generation in the driver IC for the scan signal lines, a space between the flexible wiring substrates 50 for the driver IC for the video signal lines is larger than a space between the flexible wiring substrates 50 for the driver IC for the scan signal lines.

FIG. 8 is a cross sectional view of FIG. 7 along the line A-A. In FIG. 8, the TFT substrate 100 on which pixel electrodes and TFTs are disposed, is opposed by the opposing substrate 200 on which a common electrode is disposed. The liquid crystal layer, which is sandwiched by the TFT substrate 100 and the counter substrate 200, is omitted in FIG. 8. In FIG. 8, the first cover glass 400 is disposed on a back surface of the TFT substrate 100; the second cover glass 500 is disposed on a front surface of the counter substrate 200. The feature of FIG. 8 is that a width of the first cover glass 400 is larger than a width of the second cover glass by ×1 on one side. A dimension of the ×1 is, for example, 15 mm when a width of the second cover glass is 300 mm. Herein after, this portion may be called as an extension portion 410.

As will be explained in FIG. 9, in the present invention, the light from the light source 10 and the lens 30 is incident in the second cover glass 500, therefore, if the second cover glass 500 is deformed by heat stress or mechanical stress, the light pass is influenced, consequently, quality of display images cannot be maintained. In the present invention, the transparent liquid crystal display device 4100 is supported by the extension 410 of the first cover glass 400, in addition, a movement in back and forth of the transparent liquid crystal display device 4100 is suppressed through the extension 410 of the first cover glass. Therefore, the stress is not transformed to the second cover glass 500, as a result, the pass of the light is not influenced; thus, quality of the display images can be maintained.

FIG. 9 is a cross sectional view of FIG. 7 along the line B-B, and a cross sectional view to show a structure of the driving portion. Right hand side in the x direction from the center of FIG. 9 is the display area 1000. In FIG. 9, the TFT substrate 100 and the counter substrate 200 are adhered to each other with seal material 150, and the liquid crystal 300 is sealed thereinside. At the bottom of the TFT substrate 100, a first cover glass 400 is disposed at an area corresponding to the display area 1000, a first heat dissipation substrate 60 is disposed at an area corresponding to the driving portion. The first heat dissipation plate 60 is made of metal, a thickness is approximately 1 mm. The first heat dissipation plate 60 adheres to the TFT substrate 100, and extends to left hand direction in FIG. 6.

In FIG. 9, a second cover glass 500 is disposed on the top of the counter substrate 200. The second cover glass 500 is made larger than the counter substrate 200; an edge of the second cover glass 500 is approximately at the same position as an edge of the TFT substrate 100 in a plan view. Considering optical coupling, OCA (Optical Clear Adhesive) is used in an adhesion between the TFT substrate 100 and the first cover glass 400 and an adhesion between the counter substrate 200 and the second cover glass 500. By the way, a conductive sheet 33 is used between the first heat dissipation plate 60 and the TFT substrate 100 considering heat dissipation.

In FIG. 9, the driver IC 40 is disposed between the TFT substrate 100 and the second cover glass 500, in other words in a terminal area of the TFT substrate 100; the flexible wiring substrate 50 is connected to the edge of the terminal area to supply signals and power to the liquid crystal display panel. A spacer 110 is disposed, in the terminal area of the TFT substrate, between the TFT substrate 100 and the counter substrate 200. The spacer 110 strengthen a mechanical strength of the TFT substrate 100 by adhering to the TFT substrate 100.

In FIG. 9, for an example, a thickness of the TFT substrate 100 is 0.5 mm, a thickness of the counter substrate 200 is 0.7 mm, a thickness of the first cover glass 400 is 3 mm and a thickness of the second cover glass 500 is 3 mm. A thickness of the liquid crystal layer 300 is 10 μm or less, which can be neglected compared with thicknesses of other components. A thickness of the spacer 110 is approximately the same as a thickness of the counter substrate 200.

In FIG. 9, a thickness of the TFT substrate 100 is thinner than a thickness of the counter substrate 200 so that the heat generated in the driver IC 40 can conduct easily, through the TFT substrate 100, to the first heat dissipation plate 60 disposed at the bottom of the TFT substrate 100. Since a basic material of the conductive sheet 33, which is disposed between and adheres to the TFT substrate 100 and the first heat dissipation plate 60, is made from resin, it can contact flexibly the TFT substrate 100 and the first cover glass 400, thus, a heat conduction to the first heat dissipation plate 60 can be made more effectively. By the way, a thickness of the counter substrate 200 is made thicker than a thickness of the TFT substrate 100, thus, a space between the TFT substrate 100 and the second cover glass 500 is made larger, consequently, a space for dispositions of the driver IC 40 and so forth can be made larger.

The conductive sheet 33 has a high heat conductivity as well as electrical conduction. The conductive sheet 33, which can be expressed as a conductive tape 33, has an adhesive at both sides; the conductive tape 33 is used to adhere and fix the first heat dissipation plate 60 to the TFT substrate 100 as will be explained later. In this embodiment, the conductive sheet 33 is used as a heat conduction sheet. A conductive sheet 33 is provided by many makers. A structure of the conductive sheet 33 is, for example, fine metal fibers formed in mesh are fixed by a resin, which is a basic material; another example of conductive sheet 33 is that electrical conductivity and heat conductivity of the sheet are improved by dispersing fine metal particles or carbon particles in the resin, and so forth.

The first heat dissipation plate 60 works as a heat sink because it is made of aluminum of a thickness of 1 mm. In addition, since aluminum has a high heat conductivity, heat dissipation to outside is made efficiently. As described above, the heat generated in the driver IC 40 is mainly absorbed in the first heat dissipation plate 60 and temperature rise in the driver IC 40 is mitigated.

In FIG. 9, the lens 30 is disposed at an edge of the second cover glass 500 in abutting. The LED 10 as a light source is disposed at another edge of the lens 30. The light from the LED 10 is guided to the display area 1000 by the lens 30. Therefore, the lens 30 is sometimes called as a light guide, however, in this specification it is called as lens.

In FIG. 9, a thickness of the lens 30 in the vertical direction (the z direction) is approximately 3 mm, which is the same thickness as the second cover glass 500. Therefore, the light from the LED 10 can enter the lens 30 and subsequently the second cover glass 500 with enough area allowance. In addition, the amount of light can be increased when an area of entering surface for the light becomes larger, therefore, display images of high contrast can be displayed.

In FIG. 9, the top surface of the lens 30 is fixed to the second heat dissipation plate 70, which is made of metal, and bent in cross sectional view. Aluminum is used as the metal in embodiment 1. A top surface of the lens 30 is disposed in suspension structure at a first surface of the second heat dissipation plate 70, which is parallel to the major surface of the counter substrate 200; alignment of the lens 30 is made via the second heat dissipation plate 70. Therefore, a dimensional accuracy of the second heat dissipation plate 70 and an alignment accuracy in assembling the other components and the second heat dissipation plate 70 together are important. A thickness of the second heat dissipation plate 70 is, for example, 0.5 mm.

A reflection sheet is disposed on the top of the lens 30 and a double-sided adhesive is used on the reflection sheet for adhesion (herein after, this structure is called as an adhesion sheet 31) with the second heat dissipation plate 70. In the meantime, since the lens 30 is disposed near the LED 10, which can be a heat source, it could become high temperature. In such a case, the adhesion sheet 31 can be made as a laminated sheet, in which a reflection sheet is formed at a side of the lens 30, a conductive sheet is formed at a side of the second heat dissipation plate 70. The heat of the lens 30 can be conducted easily to the second heat dissipation plate 70 if the conductive sheet 31 is used. In the meantime, a bottom surface of the lens is required only to be a reflection surface, therefore, e.g., a reflection sheet 32, which can adhere with the lens 30, can be used.

In FIG. 9, the LED 10 as a light source is disposed at a side surface of the lens 30, which is an opposite side to the side surface of the lens 30 abutting to the second cover glass 500. The LED 10 is attached to the LED substrate 20. The LED substrate 20 is disposed in close contact with a second surface of the second heat dissipation plate 70. In the meantime, the second surface of the second heat dissipation plate 70 is in orthogonal direction to the first surface. Therefore, the heat generated in the LED 10 is dissipated to the second dissipation plate 70 through the LED substrate 20. In the meantime, the conductive sheet 33 is used for the adhesion between the LED substrate 20 and the second heat dissipation plate 70 to improve heat coupling. As described above, the heat generated in the LED 10 is mainly dissipated to the second heat dissipation plate 70.

Current is supplied to the LED 10 through the LED substrate 20. The power is supplied from outside to the LED substrate 20 through a socket 25, which is disposed at an outer surface of the second heat dissipation plate 70. A hole or cut out are formed in the second heat dissipation plate 70 corresponding to the socket 25 to connect the socket 25 to the LED substrate 20.

In FIG. 9, the LED 10 and the incident surface of the lens 30 look in close contact, however, there is a space of about 10 μm between them. An accuracy in such small dimension is determined by dimensional accuracy of the second heat dissipation plate 70 as a component level, attaching accuracy of the LED substrate 20 to the second heat dissipation plate 70, attaching accuracy of the lens 30 to the second heat dissipation plate 70 and an attaching accuracy of the LEDs 10 to the LED substrate 20. Since adhering the LED substrate 20 and the lens 30 to the second heat dissipation plate 70 is made before the second heat dissipation plate 70 is attached to the display device, in other words, those processes are made when the second heat dissipation plate 70 is in a single component, therefore, assembly accuracy can be got easily. By the way, the second heat dissipation plate 70 is formed from aluminum of a thickness of 0.5 mm in embodiment 1, however, a thickness can be adjustable considering heat dissipation and accuracy in machining. By the way, if the second heat dissipation plate 70 is formed by press, a high dimensional accuracy can be acquired.

In FIG. 9, the light, which entered the lens 30 from the LED 10, exits lens 30 and enters the second cover glass 500 through a side surface of the second cover glass 500. The light, which entered the second cover glass 500, is guided to the display area 1000 after repeating total reflections. A distance from an emitting surface of the lens 30 to an edge of the display area 1000 corresponds to a size of the terminal area of the TFT substrate 100 in the x direction. Some light does not make a total reflection in this region; therefore, embodiment 1 uses, e.g., a white PET (Polyethylene Terephthalate) for the spacer 110 to reflect the light which does not make a total reflection in this area, thus, light utilizing efficiency is raised.

In FIG. 9, the light emitted from the lens 30 reflects at a surface of the spacer 110, and make a total reflection at the second cover glass 500, then enters the liquid crystal layer 300. In the meantime, instead of the white PET, a resin block, in which a reflection film is formed on the top, can be adhered on the terminal area of the TFT substrate 100 as the spacer 110. In any events, the spacer 110 is used to strengthen a mechanical strength of the TFT substrate 100, as well as used as a reflection component to raise a light utilization efficiency in embodiment 1.

On the other hand, a top of the second cover glass 500 is covered by the second heat dissipation plate 70 in an area corresponding to the terminal area of the TFT substrate 100 in a plan view; the second heat dissipation plate 70 reflects the light, which does not make a total reflection, to the second cover glass 500, thus, light utilizing efficiency is raised. In FIG. 9, the second heat dissipation plate 70 merely contacts the second cover glass 500, however, it does not adhere to the second cover glass 500 to avoid that a stress is transferred to the second cover glass 500. As described above, a lens unit, which includes the lens 30, the LED 10, the second light dissipation plate 70 and so forth, does not adhere to the second cover glass 500, thus, the second cover glass 500 can avoid a heat stress in the lens unit. As a result, an influence on the image quality due to deformation of the second cover glass 500 can be avoided. In other words, the lens unit, which includes the lens 30, the LED 10, the second heat dissipation plate 70 and so forth is fixed to the TFT substrate 100 through the first heat dissipation plate 60, which is adhered to the TFT substrate 100 via the conductive sheet 33, and the third heat dissipation plate 80, which is explained later.

Another feature of the present embodiment is that a distance dl between the LED 10 and the driver IC 40, both are heat sources, can be made large. If the LED 10 and the driver IC 40 are disposed in a small distance in the terminal area of the TFT substrate 100, as in the conventional example, the temperature of the components becomes even higher than that in a case where each of the components is disposed alone due to synergy effect; as a result, a decrease in light emitting efficiency of the LED 10 becomes severe, and a probability of malfunction of the driver IC 40 increases.

In contrast, in the present embodiment, in a plan view, a large distance can be taken between the LED 10 and the driver IC 40, through the lens 30. In addition, a measure to suppress a temperature rise is taken in each of the LED 10 and the driver IC 40, thus, a temperature rise in LED 10 and the driver IC 40 can be suppressed.

In FIG. 9, a first heat dissipation plate 60 and a third surface of the second heat dissipation plate 70 extend in the x direction to the left and are connected to each other through a third heat dissipation plate 80. The third heat dissipation plates 80 are disposed in the y direction with a distance to avoid the flexible wiring substrate 50. Therefore, the flexible wiring substrates 50, which extend to outside, are not stopped by the third heat dissipation plate 80. A contact between the third heat dissipation plate 80 and the first heat dissipation plate 60, and, a contact between the third heat dissipation plate 80 and the second heat dissipation plate 70 are surface contacts, thus, heat resistance between those heat dissipation plates is small. In this embodiment, a conductive sheet 33 is sandwiched between the third heat dissipation plate 80 and the first heat dissipation plate 60, and, between the third heat dissipation plate 80 and the second heat dissipation plate 70, therefore, thermal contacts between those plates are further improved.

Therefore, according to the structure of FIG. 9, a temperature rise in the driving portion of the transparent liquid crystal display device can be suppressed, and temperatures in the entire driving portion can be made uniform. Consequently, a heat stress caused by the driving portion can be made smaller. That is to say, a deformation of the second cover glass 500 and so forth due to a heat stress are suppressed, and deterioration of the image quality can be suppressed.

Figure 10:
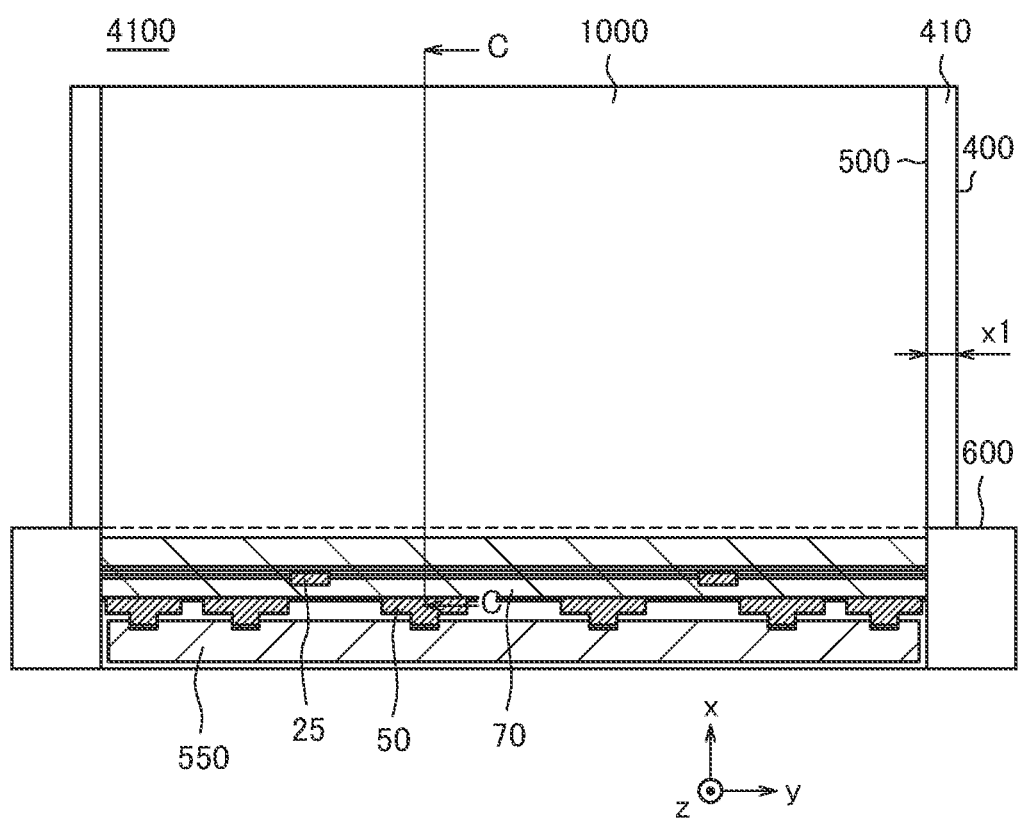
FIG. 10 is a front view of the transparent liquid crystal display device with a supporting portion.

FIG. 10 is a plan view to show a structure in which the transparent liquid crystal display device 4100 is supported from the bottom (in the x direction). Actually, the supporting portion 600 has a front cover 610, however, the front cover 610 is omitted in FIG. 10 so that the driving portion of the transparent liquid crystal display device 4100 can be visible. In FIG. 10, the transparent liquid crystal display device 4100 is constituted from the first cover glass 400 and the second cover glass 500; a width of the first cover glass 400 is larger than a width of the second cover glass 500 by ×1 on one side. This extension 410 of the first cover glass 400 is disposed on the supporting portion 600 and the transparent liquid crystal display device 4100 is supported. Mechanical stress for supporting the transparent liquid crystal display device 4100 is not added to the second cover glass 500.

Figure 11:
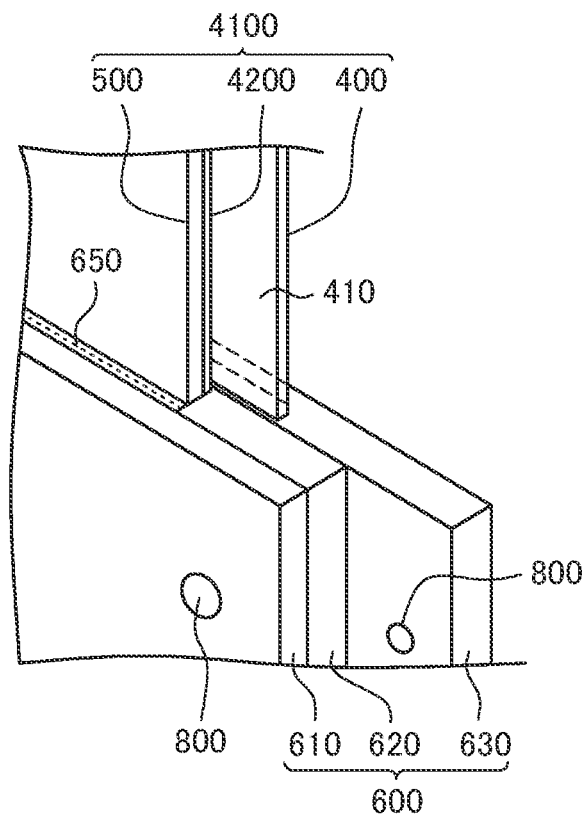
FIG. 11 is a perspective view of a structure in which the transparent liquid crystal display device is being supported by the supporting portion.

FIG. 11 is a perspective view in which the transparent liquid crystal display device 4100 is supported by the support portion 600. In FIG. 11, the liquid crystal display panel 4200, which is constituted from the TFT substrate 100 and the counter substrate 200, is sandwiched by the first cover glass 400 and the second cover glass 500. The support portion 600 is constituted from the front cover 610, the spacer 620 and the back cover 630. The extension 410 of the first cover glass 400 of the transparent liquid crystal display device 4100 is disposed on the back cover 630 of the support portion 600, thus, the transparent liquid crystal display device 4100 is supported.

Figure 12:
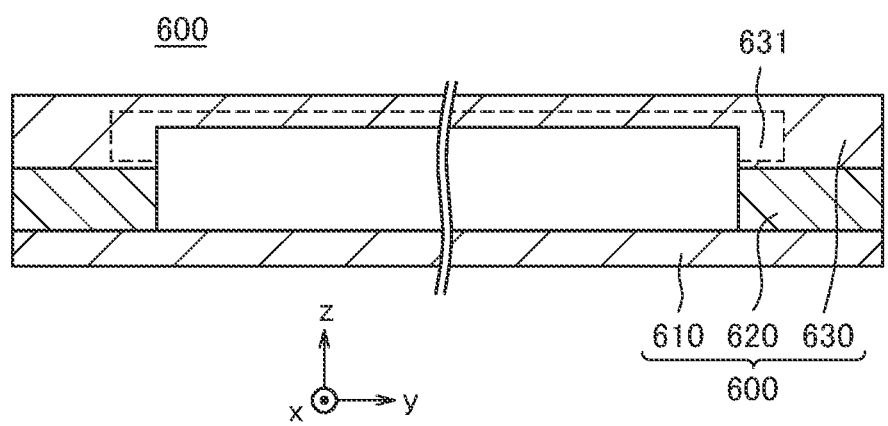
FIG. 12 is a plan view of the supporting portion.

FIG. 12 is a plan view of the supporting portion 600 viewed from the top. The support portion 600 is constituted from the front cover 610, the spacer 620 and the back cover 630; a rectangle hole is formed inside, in a plan view. The transparent liquid crystal display device 4100 is inserted in this hole. In FIG. 12, the extension 410 of the first cover glass 400 of the transparent liquid crystal display device 4100 is disposed on inside of a broken line 631, thus, the transparent liquid crystal display device 4100 is supported. In more precisely speaking, the transparent liquid crystal display device 4100 is supported by the extensions 410 of the first cover glass 400 and by that a rear part of the first cover glass 400 between the two extensions 410 is supported by the back cover 630 in a plan view.

In FIG. 12, a width in the z direction of the hole formed in the supporting portion 600 is wider enough than a thickness of the transparent liquid crystal display device 4100. The first heat dissipation plate 60, which is attached to back of the terminal area of the TFT substrate 100 of the transparent liquid crystal display device 4100, is disposed in contact with an inner surface of the back plate 630; therefore, there exist a space between the second cover glass 500 and an inner surface of the front cover 610. Therefore, stress, which is generated when assembling the transparent liquid crystal display device 4100 or during an operation of the transparent liquid crystal display device 4100, is not transferred to the second cover glass 500 from the supporting portion 600. However, since there is a chance that light could leak to outside through this space, a soft buffer substance 650, which does not make a mechanical stress, is inserted in the space, as depicted in FIG. 11. The buffer substance 650 is a sponge like substance made from, e.g., urethan, which is far softer compared with the material for constituting the supporting portion 600 or the second cover glass 500.

Figure 13:
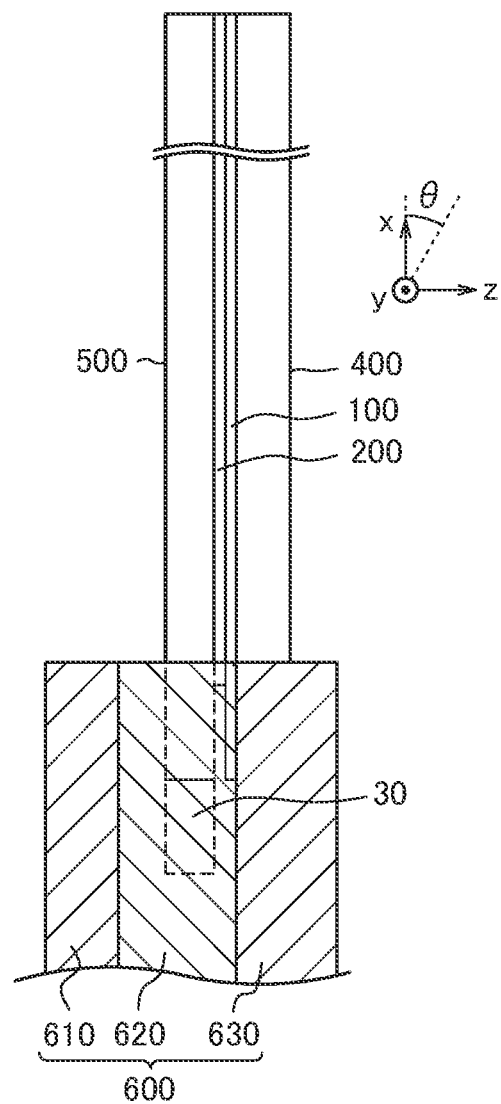
FIG. 13 is a side view of FIG. 10.

FIG. 13 is a side view of FIG. 10. In FIG. 13, the first cover glass 400 of the transparent liquid crystal display device is disposed on back cover 630 of the supporting portion 600. The TFT substrate 100, the counter substrate 200, the second cover glass 500, lens 30 and so forth, which constitute the transparent liquid crystal display device 4100, are inserted in an inner hole formed from a spacer 620 of the supporting portion 600.

Figure 14:
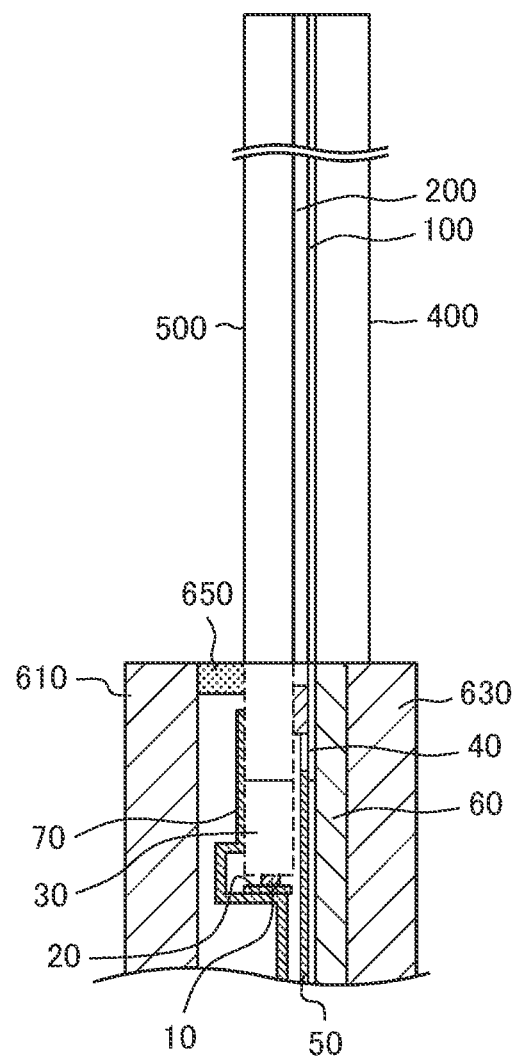
FIG. 14 is a cross sectional view of FIG. 10 along the line C-C.

FIG. 14 is a cross sectional view of FIG. 10 along the line C-C. This portion corresponds to the hole of the supporting portion 600, therefore, the spacer 620 does not exist. The TFT substrate 100, the counter substrate 200, the first heat dissipation plate 60, the second heat dissipation plate 70, and optical components such as the lens 30, LED 10 and so forth, are disposed in the hole. In FIG. 14, the second cover glass 500 which constitutes a light guide does not directly contact the supporting portion 600. The second cover glass 500 contacts the buffer substance 650, however, the buffer substance 650 is made of very soft material, it does not give mechanical stress to the second cover glass 500. Further, although optical components such as the lens 30 and LED 10 and the second heat dissipation plate 70 that supports the LED substrate 20 and the like also contact the second cover glass 500, they do not adhere to the second cover glass 500, and therefore, do not give stress to the second cover glass 500.

Figure 15:
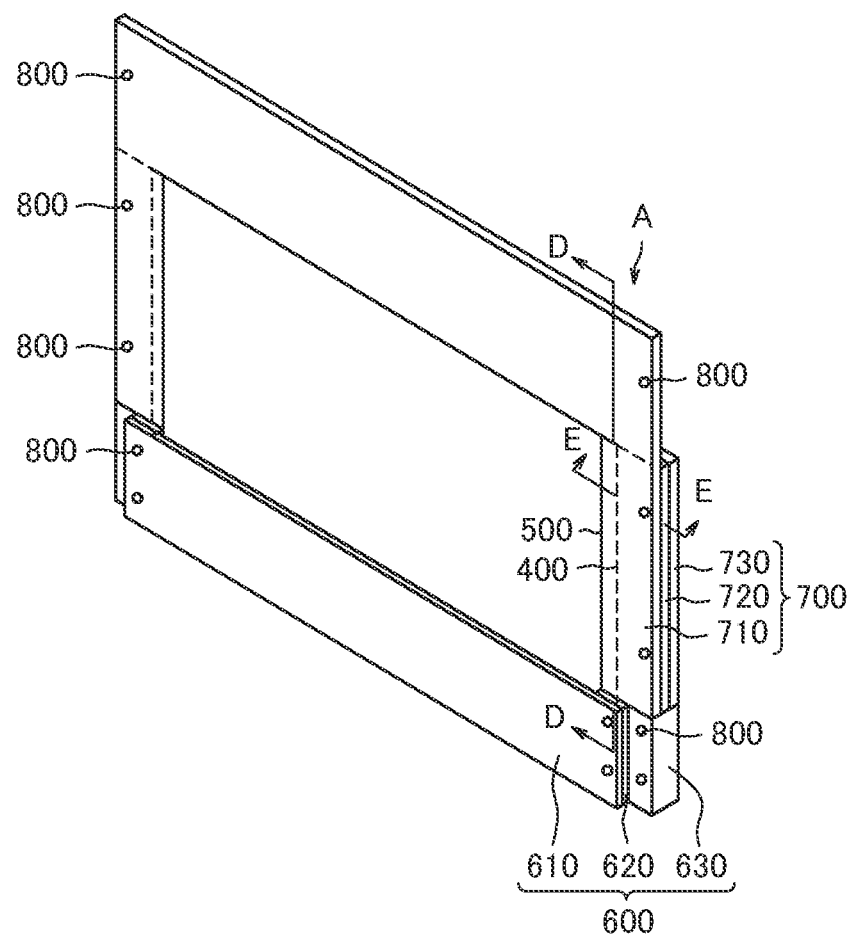
FIG. 15 is a perspective view of the transparent liquid crystal display device before it is assembled with the pole.

As shown in FIG. 11 to FIG. 14, the transparent liquid crystal display device 4100 is supported by the support portion 600 through the first cover glass 400. However, the structure of FIGS. 11 to 14 cannot counter measure a leaning back and forth of the transparent liquid crystal display device 4100 as marked by 6 in FIG. 13. In the present embodiment, as shown in FIG. 15, the extension 410 of the first cover glass 400 of the transparent liquid crystal display device 4100 is sandwiched by a first transparent plate 710, a second transparent plate 720 and a third transparent plate 730; the first transparent plate 710, the second transparent plate 720 and the third transparent plate 730 are fixed to the pole 5 by screws 800 as shown in FIG. 6; thus, fixation of the transparent liquid crystal display device 4100 is made. In this case, too, the first transparent plate 710, the second transparent plate 720 and the third transparent plate 730 contact only the extension 410 of the first cover glass 400, therefore, stress is not transferred to the second cover glass 500 or other optical components.

Figure 16:
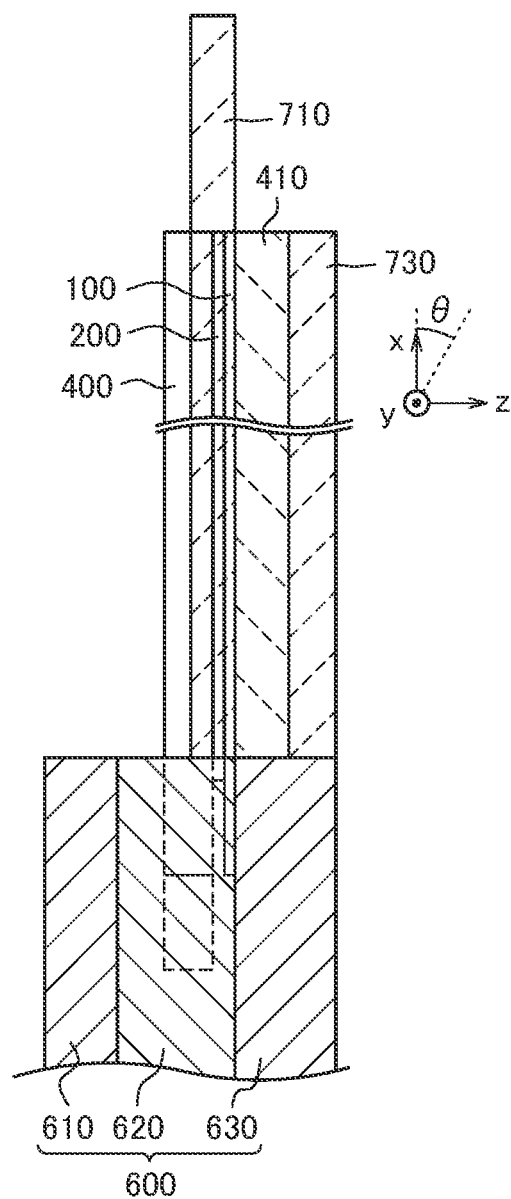
FIG. 16 is a cross sectional view of FIG. 15 along the line D-D.

FIG. 16 is a cross sectional view of FIG. 15 along the line D-D of FIG. 15. In FIG. 16, the extension 410 of the first cover glass 400 of the transparent liquid crystal display device 4100 is sandwiched and fixed by the first transparent plate 710 and the third transparent plate 730. The first transparent plate 710 and the third transparent plate 730 are fixed by screws 800 to the pole 5 as shown in FIGS. 15 and 16. That is to say, whole transparent liquid crystal display device 4100 is fixed to the supporting portion 600 through the extension 410 of the first cover glass 400.

Figure 17:
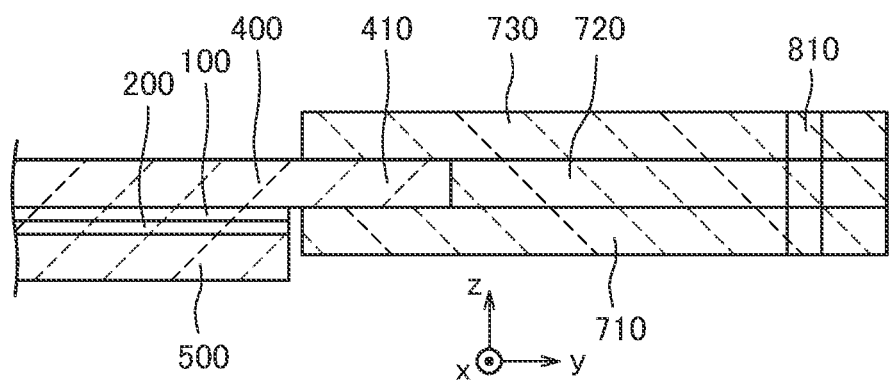

FIG. 17 is a cross sectional view of FIG. 15 along the line E-E. In FIG. 17, the transparent liquid crystal display device 4100 is constituted from the first cover glass 400, the TFT substrate 100, the counter substrate 200 and the second cover glass 500. The extension 410 of the first cover glass 400 is sandwiched and fixed by the first transparent plate 710 and the third transparent plate 730. The second transparent plate 720, which works as a spacer, is located at right hand side of the extension 410 of the cover glass 400; the second transparent plate 720 is sandwiched by the first transparent plate 710 and the third transparent plate 730. A hole 81 for the screw is formed in common in the first transparent plate 710, the second transparent plate 720 and the third transparent plate 730.

Figure 18:
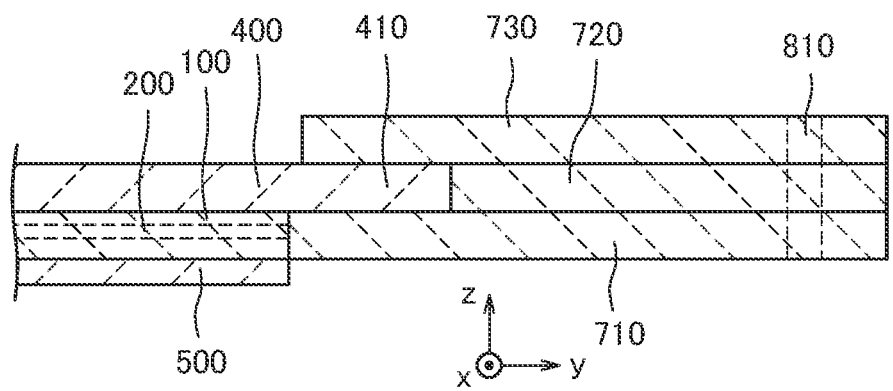
FIG. 18 is a cross sectional view of FIG. 15 along the line E-E.

FIG. 18 is a top view of upper surface of an assembly of the transparent liquid crystal display device 4100 of FIG. seen from A, namely, from top. In FIG. 18, the extension 410 of the first cover glass 400 is sandwiched and fixed by the first transparent plate 710 and the third transparent plate 730. In FIG. 18, the first transparent plate 710 further covers the TFT substrate 100, the counter substrate 200 and a part of the second cover glass 500, which constitute the transparent liquid crystal display device 4100, from the top, and extends to the left direction (in the –y direction). A part of the second cover glass 500 protrudes from front of the first transparent plate 710 (in the –z direction).

Figure 19:
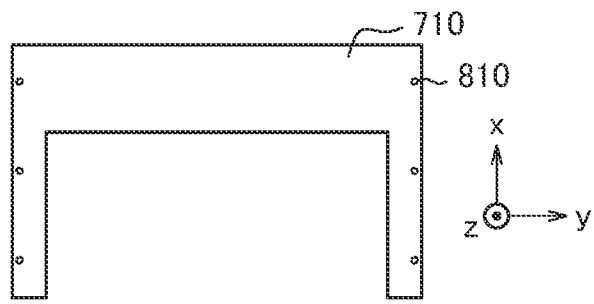
FIG. 19 is a front view of a first transparent plate.

FIG. 19 is a front view of the first transparent plate 710, which supports the transparent liquid crystal display device 4100 from front. The first transparent plate 710 is U shaped; the display area 1000 of the transparent liquid crystal display device 4100 is accommodated in a rectangle hollow area surrounded by the U shaped first transparent plate 710. The screw hole 810 is formed in a vicinity of an edge of the first transparent plate 710 for the screw to attach the first transparent plates 710 to the pole 5.

Figure 20:
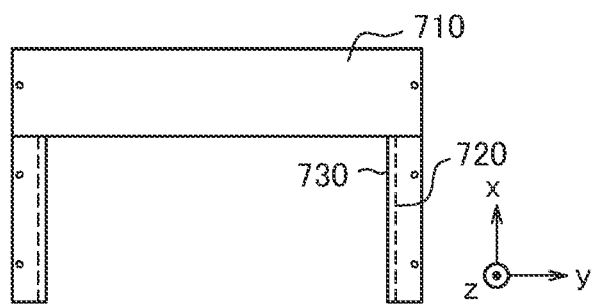
FIG. 20 is a front view of a first transparent plate to which a second transparent plate and a third transparent plate are attached.

FIG. 20 is a back view of the first transparent plate 710. In FIG. 20, the third transparent plate 730 is disposed at an extending part in x direction of the U shaped first transparent plate 710 to sandwich the extension 410 of the first cover glass 400 of the transparent liquid crystal display device 4100. The second transparent plate 720 works as a spacer to fill the place in which the extension 410 of the first cover glass 400 does not exists.

Figure 21:
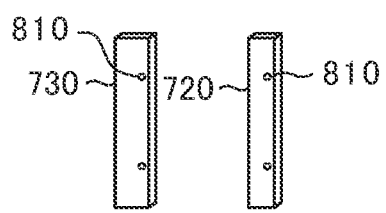
FIG. 21 is perspective views of the second transparent plate and the third transparent plate.

FIG. 21 is a perspective views of the third transparent plate 730 and the second transparent plate 720. Even both the third transparent plate 730 and the second transparent plate 720 are simple plates, as shown in FIG. 21, a width of the third transparent plate 730 is larger than a width of the second transparent plate 720. A difference in width between the width of the third transparent plate 730 and the width of the second transparent plate 720 corresponds to the width ×1 of the extension 410 of the first cover glass 400 of the transparent liquid crystal display device 4100.

Figure 22:
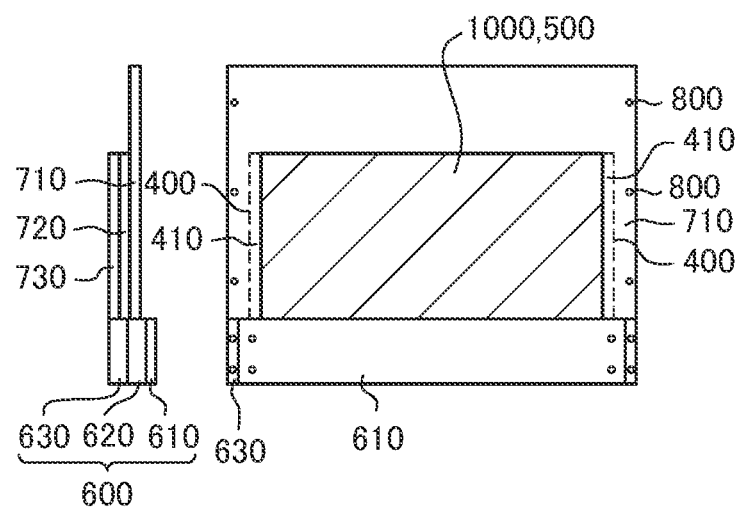
FIG. 22 includes a front view and a side view in which the transparent liquid crystal display device is incorporated into a frame.

FIG. 22 is a front view and a side view in which the transparent liquid crystal display device 4100 is held by the first transparent plate 710, the second transparent plate 720 and the third transparent plate 730. In the side view in left hand side of FIG. 22, the first transparent plate 710, the second transparent plate 720 and the third transparent plate 730 are disposed on the supporting portion 600. In the front view in right hand side of FIG. 22, the second cover glass 500 of the transparent liquid crystal display device 4100, namely, the display area 1000 is disposed in an area surrounded by the first transparent plate 710. The extension 410 of the first cover glass 400 is sandwiched between the first transparent plate 710 and the third transparent plate 730, which is disposed at the back of the extension 410.

Figure 23:
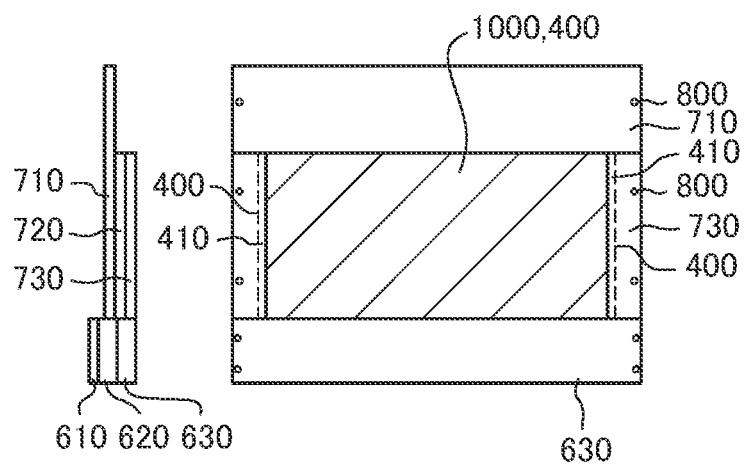
FIG. 23 includes a rear view and a side view in which the transparent liquid crystal display device is incorporated into a frame.

FIG. 23 is a back view and a side view in which the transparent liquid crystal display device 4100 is held by the first transparent plate 710, the second transparent plate 720 and the third transparent plate 730. In the side view on the lefthand side of FIG. 23, the structure is the same as FIG. 22 but only left and right are reversed. In the back view of FIG. 23, the extension 410 of the first cover glass 400 of the transparent liquid crystal display device 4100 is sandwiched between the first transparent plate 710 and the third transparent plate 730.

In FIGS. 22 and 23, the first transparent plate 710, the second transparent plate 720 and the third transparent plate 730 are fixed to the pole 5 by screws 800. The transparent plates 710, 720, and 730 are formed from, for example, acrylic, polycarbonate and so forth. A thickness of each of the transparent plates 710, 720, and 730 is, for example, approximately, 3 mm.

As described above, a mechanical stress, which is generated during assembling the transparent liquid crystal display device, and thermal stress can be made smaller in the second cover glass 500, which works as a light guide in the liquid crystal display device; therefore, a variation of light pass in the second cover glass 500 can be made smaller. Thus, a variation in the quality of display images can be suppressed.

Embodiment 2

In embodiment 1, the pole 5 is used as shown in FIG. 6 to support the transparent plate 700 and the support portion 600 in common. In the meantime, a usage of the transparent liquid crystal display device according to the present invention is not limited in a partition shown in FIG. 6. The transparent liquid crystal display device can be used, for example, in insertion in the show window.

In such a usage, the pole 5 as shown in FIG. 6 may not fit. In embodiment 2, instead of the pole 5, a fourth transparent plate 740 is used as a structure to support the transparent plate 700 and the supporting portion 600 in common as shown in FIGS. 24 and 25.

Figure 24:
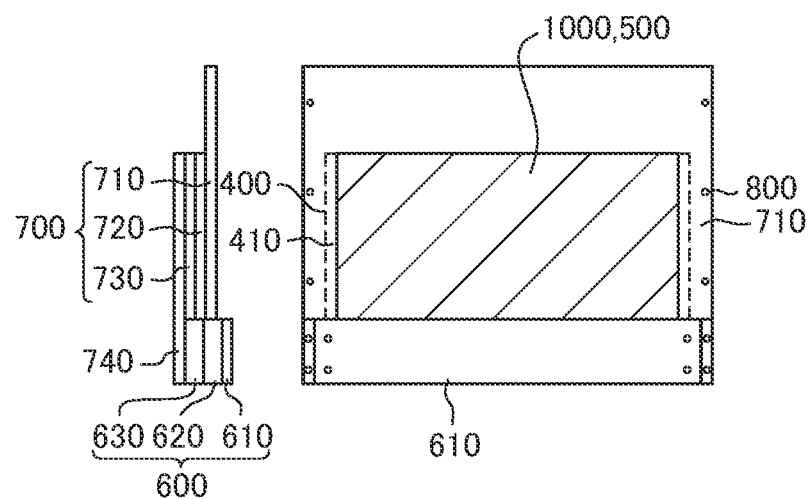
FIG. 24 includes a front view and a side view in which the frame and the support portion are fixed in common by a plate component.

FIG. 24 is a front view and a side view, in which an assembly including the transparent liquid crystal display device 4100 is supported by the fourth transparent plate 740, which is disposed at a back of the third transparent plate 730 and the back cover 630. The fourth transparent plate 740 and other transparent plate 700, as well as, the fourth transparent 740 and the supporting portion 600 are fixed by, for example, screws 800. Other structures of FIG. 24 are the same as FIG. 22 of embodiment 1.

FIG. 23 is a back view and a side view, in which an assembly including the transparent liquid crystal display device 4100 is supported by the fourth transparent plate 740, which is disposed at a back of the third transparent plate 730 and the back cover 630. The fourth transparent plate 740 and other transparent plate 700, as well as, the fourth transparent plate 740 and the supporting portion 600 are fixed by, for example, screws 800. Other structures are the same as FIG. 23 of embodiment 1.

Figure 25:
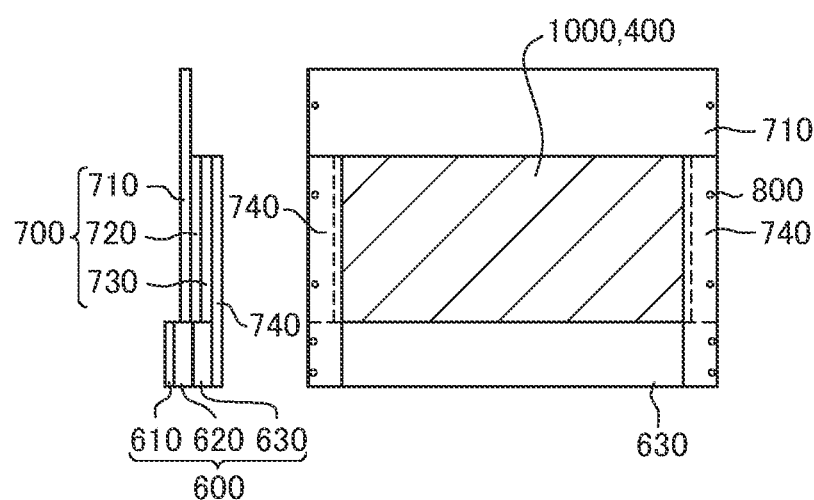
FIG. 25 includes a rear view and a side view in which the frame and the support portion are fixed in common by a plate component.

The transparent display device can maintain flat structure as a total according to the structure of FIGS. 24 and 25; therefore, the transparent display device can be used in various places according to necessity.

Embodiment 3

In embodiment 1 and embodiment 2, the frame which surrounds the display area 1000 of the transparent liquid crystal display device 4100 is formed from the transparent plate 700. However, there is a demand to use the transparent liquid crystal display device 4100 as a window. That is to say, the transparent liquid crystal display device 4100 is usually used as a window, and it is used as a display device only when there is a demand. In such case, sometimes the frame is preferred to be opaque.

Figure 26:
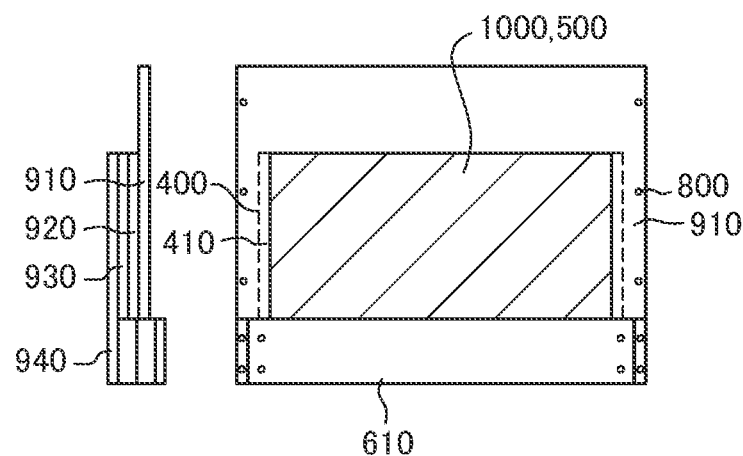
FIG. 26 includes a front view and a side view when an opaque frame is used for the transparent liquid crystal display device.
Figure 27:
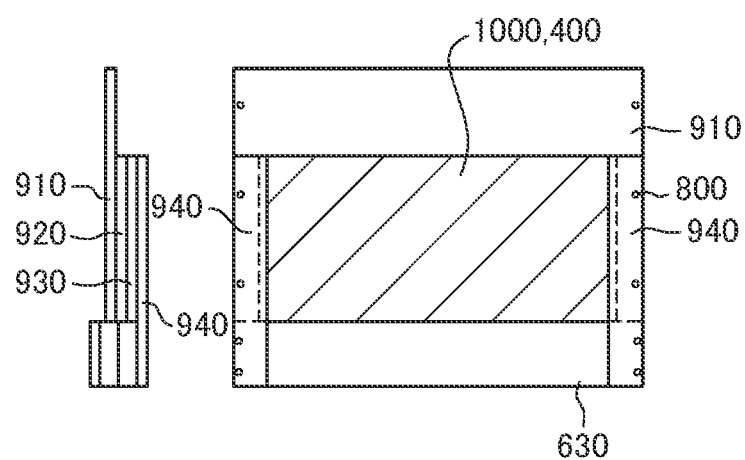
FIG. 27 includes a rear view and a side view when an opaque frame is used for the transparent liquid crystal display device.

FIG. 26 is a front view and a side view, in which opaque frames are used as a first frame 910, a second frame 920, a third frame 930, and fourth frame 940. FIG. 27 is a back view and a side view of the same structure as FIG. 26. The structure of FIG. 26 is the same as FIG. 24 of embodiment 2 and the structure of FIG. 27 is the same as FIG. 25 of embodiment 2 except opaque frames as 910, 920, 930 and 940 are used.

Various materials as metal, resin and so forth can be used for an opaque frame. The structure of embodiment 3 can be used in various usage.

What is claimed is:

1. A liquid crystal display device including a liquid crystal display panel in which liquid crystal is sandwiched between a TFT substrate, having a pixel, and a counter substrate comprising:
    a display area being formed in an area in which the TFT substrate and the counter substrate overlap each other;
    a terminal area being formed on the TFT substrate, in which the counter substrate does not overlap;
    the terminal area being formed along a first side of the counter substrate which extends in a first direction;
    a second cover glass including glass and being disposed on the counter substrate; and
    a first cover glass including glass and being disposed under the TFT substrate,
    wherein a width of the first cover glass in the first direction is larger than a width of the second cover glass in the first direction.
2. The liquid crystal display device according to claim 1, wherein a width of the first cover glass in the first direction is larger than a width of the second cover glass in the first direction in both sides in the first direction.
3. The liquid crystal display device according to claim 1, Wherein, in a direction orthogonal to the first direction, a width of the second cover glass is larger than a width of the first cover glass.
4. The liquid crystal display device according to claim 3, wherein a first heat dissipation plate is disposed on a rear surface of the terminal area of the TFT substrate.

5. The liquid crystal display device according to claim 1,
wherein a first edge of a lens is disposed at an edge of the second cover glass,
an LED as a light source is disposed at a second edge of the lens, in which the second edge is an opposite edge to the first edge, and
each of a drover IC and the LED is attached to a different component.

6. The liquid crystal display device according to claim 5,
wherein the driver IC is disposed on the terminal area.

7. The liquid crystal display device according to claim 5,
wherein a first heat dissipation plate is disposed on a rear surface of the terminal area of the TFT substrate,
a second heat dissipation plate is disposed covering the lens and the LED,
the second heat dissipation plate is connected to the first heat dissipation plate, and
the second heat dissipation plate does not adhere to the second cover glass.

8. The liquid crystal display device according to claim 1,
wherein the liquid crystal has a structure in which fine particles including liquid crystal molecules inside are dispersed in a polymer, and a common electrode is formed on the counter substrate.

9. A display device including:
a liquid crystal display panel in which liquid crystal is sandwiched between a TFT substrate, having a pixel, and a counter substrate,
a supporting portion, on which the liquid crystal display panel is disposed, and
a frame portion which surrounds the liquid crystal display panel,
the liquid crystal display panel further including:
a display area being formed in an area in which the TFT substrate and the counter substrate overlap each other,
a terminal area being formed on the TFT substrate, in which the counter substrate does not overlap,
the terminal area being formed along a first side of the counter substrate which extends in a first direction,
a second cover glass including glass and being disposed on the counter substrate, and
a first cover glass including glass and being disposed under the TFT substrate,
wherein a width of the first cover glass in the first direction is larger than a width of the second cover glass in the first direction, and
an extending portion in the first direction of the first cover glass is supported by the supporting portion.

10. The display device according to claim 9,
wherein the second cover glass is not supported by the supporting portion.

11. The display device according to claim 9
wherein the extending portion in the first direction of the first cover glass is sandwiched by a first frame and a second frame.

12. The display device according to claim 11,
wherein the second cover glass is not sandwiched by a first frame and a second frame.

13. The display device according to claim 11,
wherein the first frame and the second frame sandwich a spacer at a place in which the first frame and the second frame do not sandwich the extending portion of the first cover glass.

14. The display device according to claim 11,
wherein the first frame and the second frame are formed from transparent material.

15. The display device according to claim 9,
wherein, a rectangle hole is formed in the supporting portion, in a plan view, and
a width of the rectangle hole in orthogonal direction to the first direction is larger than a thickness of the liquid crystal display panel.

16. The display device according to claim 15,
wherein the second cover glass does not contact the supporting portion.

17. The display device according to claim 16,
wherein a buffer substance, which is softer than the supporting portion and the second cover glass, is disposed between an inner side of the rectangle hole of the supporting portion and the second cover glass.

18. The display device according to claim 11,
wherein the supporting portion and the second frame are commonly fixed to a pole.

19. The display device according to claim 11,
wherein the supporting portion and the second frame are commonly fixed by a third frame.

20. The display device according to claim 9,
the liquid crystal has a structure in which fine particles including liquid crystal molecules inside are dispersed in a polymer, and a common electrode is formed on the counter substrate.

* * * * *